United States Patent [19]
Dugan

[11] 4,455,729
[45] Jun. 26, 1984

[54] FIBER OPTIC CONNECTOR TOOL
[75] Inventor: John M. Dugan, Garland, Tex.
[73] Assignee: Rockwell International Corporation, El Segundo, Calif.
[21] Appl. No.: 484,017
[22] Filed: Apr. 11, 1983

Related U.S. Application Data

[63] Continuation of Ser. No. 238,180, Feb. 25, 1981, abandoned.

[51] Int. Cl.³ .............................................. B23P 19/02
[52] U.S. Cl. ......................................... 29/235; 29/280
[58] Field of Search ................. 29/235, 278, 280, 270

[56] References Cited
U.S. PATENT DOCUMENTS

| | | | |
|---|---|---|---|
| 2,981,189 | 4/1961 | Pars | 29/235 |
| 3,289,286 | 12/1966 | Belanger | 29/235 |
| 3,378,909 | 4/1968 | Esposito | 29/235 |
| 3,696,494 | 10/1972 | Mackal et al. | 29/235 |
| 4,136,431 | 1/1979 | Tucker | 29/280 |
| 4,330,917 | 5/1982 | Dzurkovich | 29/264 |

*Primary Examiner*—James L. Jones, Jr.
*Attorney, Agent, or Firm*—V. Lawrence Sewell; Howard R. Greenberg; H. Fredrick Hamann

[57] ABSTRACT

A service tool is provided for a fiber optic connection system in which a pair of facing fiber optic connector ends are collinearly aligned by a tubular alignment insert therearound, all within an outer concentric tubular connection sleeve. After withdrawal of one of the connectors, the tool serves as an extraction tool for removing the alignment insert around the connector end within the outer concentric sleeve. The tool has another side serving as a test gauge for determining the presence or absence of the alignment insert around the end of the fiber optic connector within the outer concentric connection sleeve without looking into the sleeve.

7 Claims, 6 Drawing Figures

FIBER OPTIC CONNECTOR TOOL

This application is a continuation of application Ser. No. 238,180, filed Feb. 25, 1981, now abandoned.

TECHNICAL FIELD

The invention relates to fiber optic connection systems of the type having a tubular alignment insert around the end of a fiber optic connector within an outer concentric tubular connection sleeve which receives another fiber optic connector whose end enters the alignment insert providing collinear registry of the facing fiber optic cable ends. The invention more particularly relates to a service tool serving as an extraction tool for removing the insert, and as a test or feeler gauge for determining the presence of an alignment insert.

BACKGROUND

In fiber optic connection systems, it is of critical importance that facing fiber optic cable ends be collinearly aligned to the greatest degree possible, to minimize transmission loss. In one type of connection system, to be more fully described hereinafter in conjunction with FIGS. 1 and 2, a fiber optic connector has its end partially inserted into a plastic tubular alignment insert. Another fiber optic connector has its end inserted into the other end of the tubular alignment insert. The connector ends fit snugly within the alignment insert and face each other with only a nominal gap therebetween. The alignment insert provides collinear registry of fiber optic cables within the connectors.

When the connectors are pulled apart, the alignment insert will remain on one or the other of the connector ends. Because of the snug fit, the insert is either pried off or is tightly grasped at its open end by pliers or the like and pulled off. In either case, removal of the insert is cumbersome and frequently causes damage to the insert.

In many applications, one of the fiber optic connector ends is mounted within an outer concentric tubular connection sleeve. The other fiber optic connector is inserted into this outer sleeve and its end enters the inner tubular alignment insert therein. Upon withdrawal of this latter fiber optic connector, the alignment insert will remain on one or the other of the connector ends. If the alignment insert remains on the withdrawn connector end, then removal of the alignment insert may be accomplished as above described.

If the tubular alignment insert stays on the connector end within the outer concentric tubular connection sleeve, then removal of the alignment insert is even more difficult because the sleeve extends well beyond the end of the fiber optic connector therein. The outer sleeve and the connector therein must be disassembled from each other in order to remove the alignment insert from around the end of the connector. This disassembly requirement is particularly objectionable in certain applications where it can only be accomplished by gaining access to the backside of a panel through which the connector extends, or the inside of a component mounting case, etc. This can require even further disassembly of associated structure in order to gain access to the other side of the fiber optic connection interface.

Furthermore, if the tubular alignment insert stays on the connector end within the outer concentric tubular connection sleeve, a safety hazard exists if the user looks inside of the outer sleeve to see if an insert is present. This is hazardous when laser radiation is emitted from the fiber optic cable in the connector therein.

SUMMARY

The present invention provides a particularly simple and efficient tool for removing the tubular alignment insert around the end of the above type of fiber optic connector, including simple removal even when the connector is within an outer concentric tubular connection sleeve, without disassembling the latter two. The invention further provides a test or feeler gauge for tactilely determining the presence or absence of the tubular alignment insert around the end of the fiber optic connector within the outer concentric tubular connection sleeve without looking into the sleeve.

DETAILED BACKGROUND DESCRIPTION

Figure 1:
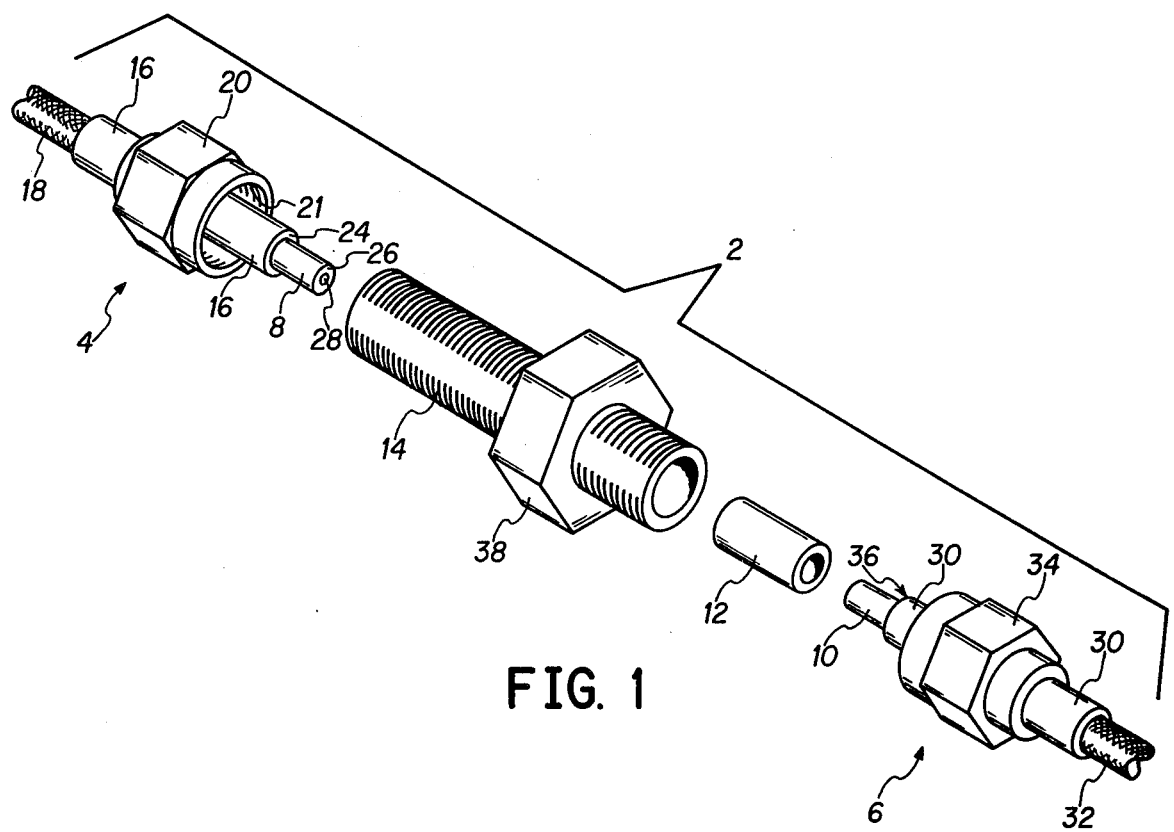
FIG. 1 shows an exploded isometric view of a fiber optic connection system for which the present invention provides a service tool.
Figure 2:
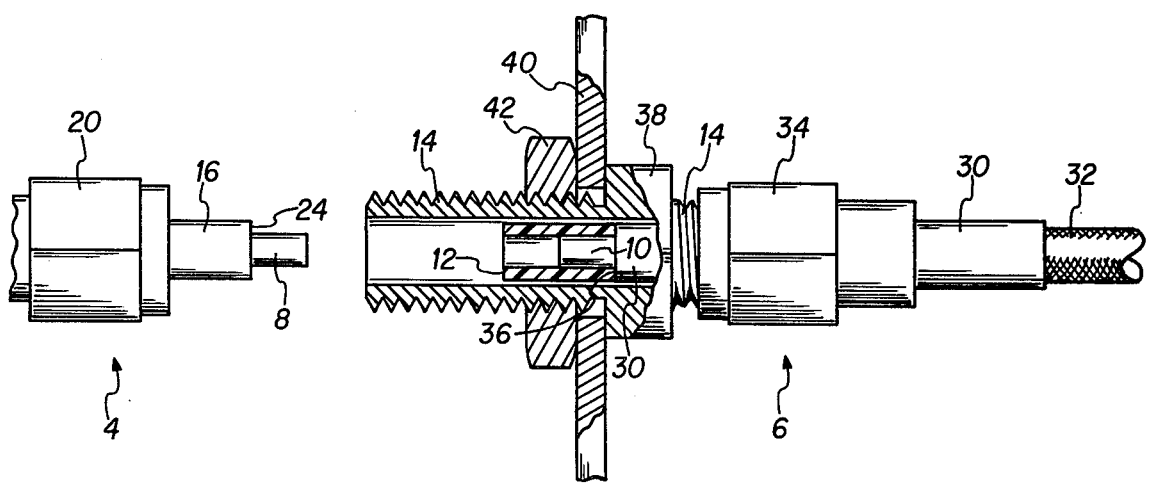
FIG. 2 shows an assembled view, partly in elevation and partly in cross-section, of the fiber optic connection system of FIG. 1 with one of the fiber optic connector ends about to be inserted.
Figure 3:
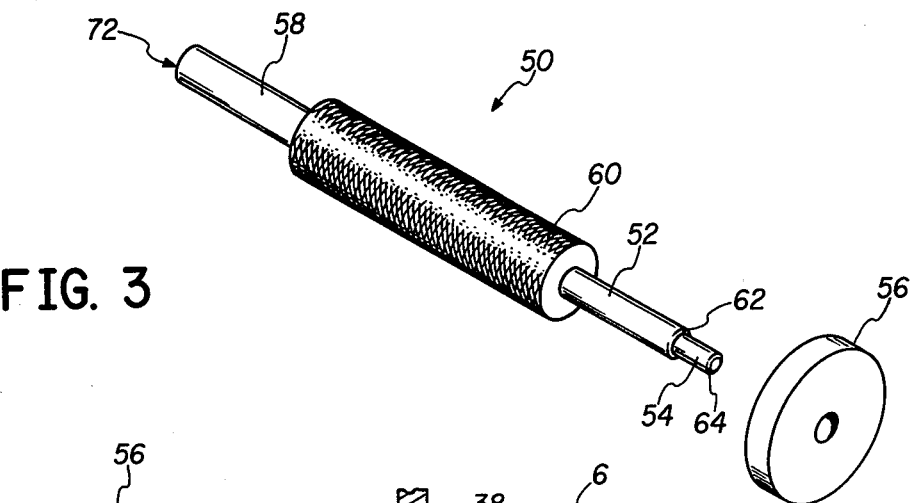
FIG. 3 shows an exploded isometric view of a fiber optic connector service tool constructed in accordance with the invention.

There is shown in FIGS. 1 and 2 a fiber optic connection system 2 for which the present invention provides an extraction and test gauge tool, FIG. 3. The fiber optic connection system of FIGS. 1 and 2 has a pair of connectors 4 and 6 with respective connector ends 8 and 10 facing each other within a tubular alignment insert 12, all within an outer concentric tubular connection sleeve 14.

Fiber optic connector 4 has a shaft 16 in which the fiber optic cable and its protective surrounding sheathing 18 is mounted. Shaft 16 extends through a hex nut 20 which is journaled on shaft 16 for rotation but is constrained against axial movement. Nut 20 is internally threaded at 21 for being screwed onto externally threaded sleeve 14. Shaft 16 extends through nut 20 and has a connector end 8 reduced from shaft 16 at reduction step 24. Connector end 8 has an end face 26 with the exposed end face 28 of the fiber optic cable at the center thereof. Connector 6 is identical, with shaft 30 receiving a fiber optic cable and its sheathing 32, having hex nut 34 journaled therearound, and having a connector end 10 reduced from shaft 30 at step 36.

Plastic alignment insert 12 is inserted around connector end 10 until stopped by step 36. The axial length of connector end 10 is about half the length of insert 12. Connector 6 and alignment insert 12 are then inserted into sleeve 14 and retained thereon by screwing internally threaded hex nut 34 onto the externally threaded sleeve 14. Sleeve 14 has a hex nut 38 integrally formed thereon and in some applications is mounted to a panel wall 40, FIG. 2, component case or the like before or after insertion of connector 6. FIG. 2 shows connection sleeve 14 mounted to wall 40 by means of threaded nut 42 screwed onto sleeve 14 to engage one side of wall 40, with integral nut 38 engaging the other side of wall 40. Connector 4 is then inserted into the other end of sleeve 14 and retained thereon by screwing internally threaded nut 20 onto externally threaded sleeve 14.

Referring to FIG. 2, alignment insert 12 has an inner diameter substantially equal to the diameter of connector ends 10 and 8 to afford a snug fit therearound. The diameter of shafts 30 and 16 is slightly less than the inner diameter of connection sleeve 14 to afford free axial insertion therein but to prevent substantial lateral movement. The annulous thickness of alignment insert 12 is substantially equal to the height of steps 36 and 24 such that the outer diameter of alignment insert 12 is substantially equal to the diameter of shafts 30 and 16.

When connector 4 is inserted rightwardly in FIG. 2, connector end 8 enters alignment insert 12 and its end face 26 faces the end face of connector end 10, with the two central fiber optic cables collinearly aligned. Upon withdrawal of connector 4, the alignment insert will stay on one of the connector ends 8 or 10. If the alignment insert 12 stays on connector end 10, as shown in FIG. 2, then access to the alignment insert is limited because outer concentric tubular connection sleeve 14 extends leftwardly outwardly therebeyond. Before reconnection, a user, in order to determine the presence or absence of an alignment insert within connection sleeve 14, may look into the sleeve. This is extremely hazardous if laser radiation is being emitted from the fiber optic cable in connector 6.

Another problem encountered when alignment insert 12 remains on connector end 10 after removal of connector 4 is that connector 6 must be disassembled from sleeve 14 in order to remove alignment insert 12. This disassembly of connector 6 from sleeve 14 is particularly objectionable when connector 6 is within a module casing 40 or panel wall and requires additional disassembly of associated structure to gain access to the interior of the module casing or panel. Even after this disassembly, insert 12 must be pried off or otherwise removed from connector end 10 of connector 6. This would also be the case if insert 12 remained on connector end 8 upon withdrawal of connector 4. This prying off is commonly done with a sharp object and frequently results in damage to the insert.

DETAILED DESCRIPTION OF THE INVENTION

FIG. 3 shows the preferred embodiment of a tool constructed in accordance with the invention for extracting alignment insert 12, whether or not within outer concentric tubular connection sleeve 14, and for testing whether alignment insert 12 is within sleeve 14 without looking into the sleeve.

The tool of FIG. 3 includes a tool body 50 having a removal shank 52 with an end 54 insertable into the tubular alignment insert 12 to slightly expand the inside diameter of the latter such that upon withdrawal, insert 12 remains on shank end 54 and is removed from connector end 10. A slider collar 56 is disposed around shank 52 and has an inside diameter smaller than the outside diameter of insert 12 on shank end 54. Collar 56 is axially slidable along shank 52 to force insert 12 off of shank end 54.

Tool body 50 has a seating shank 58 with a diameter smaller than the inside diameter of sleeve 14 and larger than the inside diameter of insert 12 such that insert 12 stops insertion of seating shank 58 into sleeve 14 at a given depth, and deeper insertion of seating shank 58 is enabled in the absence of insert 12.

Tool body 50 has a central enlarged user gripped handle portion 60 which preferably is an elongated knurled cylindrical segment integral with shanks 52 and 58 extending oppositely therefrom.

Figure 4:
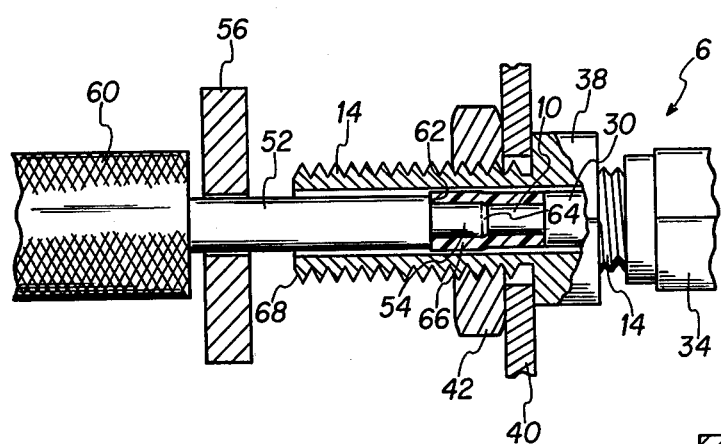
FIG. 4 is a view like FIG. 2 but shows the service tool providing removal of the alignment insert.

Referring to FIG. 4, collar 56 is disposed around removal shank 52 and the shank is inserted into sleeve 14 of FIG. 2. As seen in FIG. 4, shank end 54 enters alignment insert 12 until stopped by reduction step 62. Removal shank end 54 has a precision diameter slightly reduced from the remainder of shank 52 by small reduction step 62 having a height less than the annulus thickness of insert 12. In FIG. 4, shank end 54 extends partially into insert 12 to face connector end 10. Shank end 54 has beveled face edges 64 to facilitate and guide entrance into insert 12. The radial expansion of insert 12 shown at 66 is exaggerated in FIG. 4 for clarity.

Figure 5:
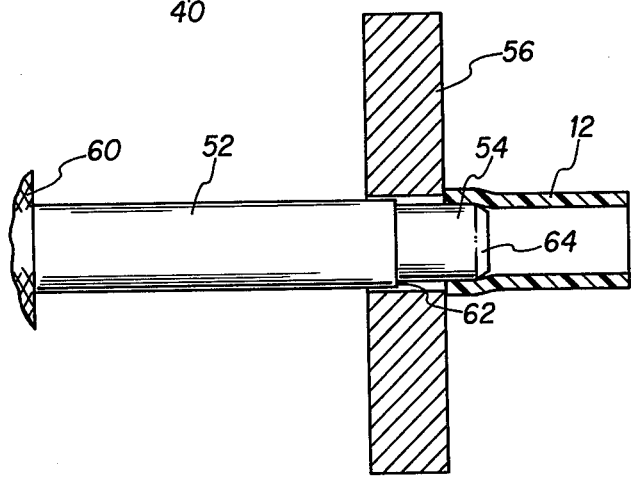
FIG. 5 is an isolated view of the portion of the service tool illustrating removal of the insert therefrom.

Upon withdrawal of shank 52 from sleeve 14 leftwardly in FIG. 4, insert 12 remains on shank end 54 and is removed from connector end 10, whereby to effect extraction of insert 12 without disassembling connector 6 and sleeve 14. After this extraction, slider collar 56 is axially slid rightwardly along shank 52, FIG. 5, to force insert 12 off of shank end 54. As above noted, step 62 has a height less than the annulus thickness of insert 12 such that the outer circumference of insert 12 protudes beyond the outer circumference of shank 52 and beyond the inner circumference of collar 56. When the extraction tool is fully inserted into sleeve 14 to engage insert 12, FIG. 4, the other outer end of shank 52 extends outwardly beyond outer lip 68 of sleeve 14 by a distance at least sufficient to accommodate slider collar 56. Under gripped handle portion 60 is at this outer opposite end of shank 52.

Figure 6:
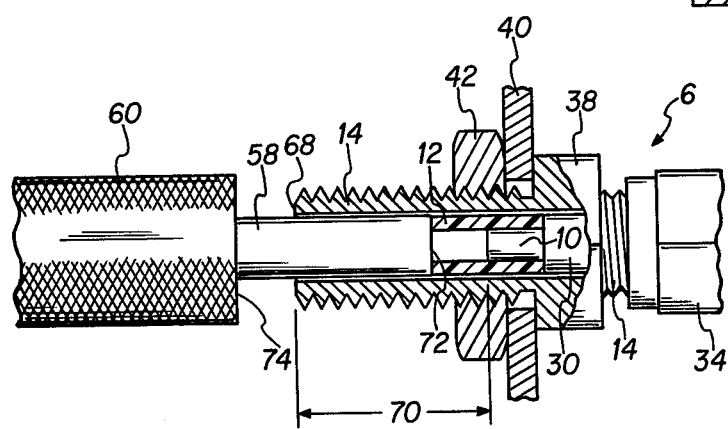
FIG. 6 is a view like FIG. 2 but showing the service tool test gauge.

Referring to FIG. 6, seating shank 58 of tool body 50 is inserted rightwardly into outer concentric tubular connection sleeve 14 of FIG. 2. The axial length of seating shank 58 is substantially equal to the distance 70 between the outer lip 68 of connector 14 and the facing end of connector end 10. If alignment insert 12 is present within sleeve 14, then the facing end 72 of seating shank 58 strikes insert 12 as seen in FIG. 6, which stops insertion of seating shank 58 at a given depth. If insert 12 is absent, deeper insertion of seating shank 58 is enabled such that central handle portion 60 at step 74 bottoms against outer edge 68 of sleeve 14 to provide a tactile indication of insert absence. This tactile indication, bottoming or non-bottoming, not only eliminates the need to look inside sleeve 14 but also eliminates the need to even have visual access to sleeve 14 or to the depth insertion of seating shank 58. This is partially valuable in systems where such visual access to components is not feasible and connection, testing, etc. must be accomplished by manual feel.

It is recognized that various modifications are possible within the scope of the appended claims.

I claim:

1. A fiber optics interconnection kit including a fiber optic connector mounted within an outer concentric tubular connection sleeve, a tubular alignment insert for use mounted around the end of the connector and an extraction tool for removing the insert, said tool comprising:

a tool body having a shank of a size insertable into said sleeve such that the end of the shank enters said insert to slightly expand the inside diameter of the latter, such that upon withdrawal of said shank from said sleeve, said insert remains on said shank end and is removed from said connector end, whereby to effect extraction of said insert without disassembling said connector and sleeve; and a slider collar around said shank and having an inside diameter smaller than the outside diameter of said insert on said shank end, said collar being movable along said shank to force said insert off said shank end.

2. The invention according to claim 1 wherein said shank end has a precision diameter slightly reduced from the remainder of said shank by a small step such that said shank end enters said insert until stopped by said step such that said shank end extends partially into said insert to face said connector end and such that the other end of said shank extends outside of said sleeve, said step having a height less than the annulus thickness of said insert such that the outer circumference of said insert protrudes beyond the outer circumference of said remainder of said shank and beyond the inner circumference of said collar.

3. A fiber optic interconnection kit including a fiber optic connector within an outer concentric tubular connection sleeve, a tubular alignment insert for use mounted around the end of the connector, and a service tool having one side serving as a test gauge for determining the presence of the insert around the end of the connector without looking into said sleeve, and having another side serving as an extraction tool for removing said insert, said tool comprising:

a tool body having a removal shank of a size insertable into said sleeve such that the end of the shank enters said insert to slightly expand the inside diameter of the latter, such that upon withdrawal of said shank from said sleeve, said insert remains on said shank end and is removed from said connector end, whereby the effect extraction of said insert without disassembling said connector and sleeve;

a slider collar around said shank and having an inside diameter smaller than the outside diameter of said insert on said shank end, said collar being movable along said shank to force said insert off said shank end;

said tool body having a seating shank with a diameter smaller than the inside diameter of said sleeve and larger than the inside diameter of said insert such said insert stops insertion of said seating shank into said sleeve at a given depth, and deeper insertion is enabled in the absence of said insert.

4. The invention according to claim 3 wherein said tool body has an enlarged user gripped central handle portion, with said seating and removal shanks integral therewith and extending oppositely therefrom.

5. The invention according to claim 4 wherein the length of said seating shank is substantially equal to the distance between the outer edge of said sleeve and said connector end such that said central handle portion of said tool body bottoms against said outer edge of said sleeve in the absence of an insert to provide a tactile indication of insert presence or absence.

6. The invention according to claim 5 wherein said removal shank end has a precision diameter slightly reduced from the remainder of said removal shank by a small step such that said removal shank end enters said insert until stopped by said step such that said removal shank end extends partially into said insert to face said connector end and such that the other end of said removal shank extends outside of said sleeve, said step having a height less than the annulus thickness of said insert such that the outer circumference of said insert protrudes beyond the outer circumference of said remainder of said removal shank and beyond the inner circumference of said collar.

7. The invention according to claim 6 wherein said handle portion comprises an elongated knurled cylindrical segment of larger diameter than said seating shank.

* * * * *